2,920,101
NITROGENOUS COMPOUNDS

Dale N. Robertson, Midland, Mich., assignor to The Dow Chemical Company, Midland, Mich., a corporation of Delaware No Drawing. Application October 18, 1956
Serial No. 616,659

8 Claims. (Cl. 260—471)

This invention relates to nitrogenous compounds and particularly N-arylidene-normal-alkylamine Schiff bases having the structure $$X\text{—}CH\text{=}N\text{—}(CH_2)_n\text{—}CH_3$$

wherein X represents a substituted aryl radical of the benzene and naphthalene series wherein the substituents are selected from the group consisting of halogen, carbalkoxyalkoxy containing from 3 to 5 carbon atoms, inclusive, nitro and phenyl; and is inclusive of aromatic radicals containing more than one substituent; and wherein the combined weight of all radicals present as substituents is greater than 50; and wherein $n$ is an integer of from 2 to 3, inclusive. Examples of aryl radicals are 4 - carbisopropoxymethoxyphenyl-, 3 - bromophenyl-, 2 - phenylphenyl-, 3 - carbethoxymethoxyphenyl-, 2,4,5-trichlorophenyl-, 2,4,6 - tribromophenyl-, 1,4 - diphenyl-2 - naphthyl-, 5 - bromo - 1 - naphthyl-, and 1 - bromo-2-naphthyl-.

The products of this invention are light yellow liquids or low melting solids which may turn brown on standing. These compounds are soluble in organic solvents such as acetone, ethanol, xylene and kerosene, and substantially insoluble in water. The compounds are useful as parasiticides and are adapted to be employed for the control of bacterial and fungal organisms. They are also useful as intermediates in the preparation of other chemical compounds.

The new compounds are prepared by the reaction of a suitable aromatic aldehyde with a normal-alkylamine, i.e. normal-propylamine or normal-butylamine, to obtain the desired N-arylidene-normal-alkylamine and water of reaction. Good results are obtained when substantially equimolar amounts of the reactants or a slight excess of the amine are employed. The reaction is preferably carried out in the presence of an inert water-immiscible organic solvent such as benzene, xylene or cyclohexane.

In carrying out the reaction, the aromatic aldehyde and normal-alkylamine are dissolved in the water-immiscible solvent and the mixture heated to codistill the water of reaction substantially as formed as an azeotrope. The reaction is conveniently carried out in an apparatus designed to collect the distillate and permit the solvent to flow back into the reaction zone. After completion of the reaction, the mixture is heated in an ordinary distilling apparatus to distill off the remaining solvent and excess amine, if employed, and to recover an N-arylidene-normal-alkylamine product as residue. The latter product may be purified, if desired, by conventional procedures, such as by fractional distillation.

The following examples illustrate the invention but are not to be construed as limiting:

*Example 1.—N-(4-carbethoxymethoxybenzylidene)-normal-butylamine*

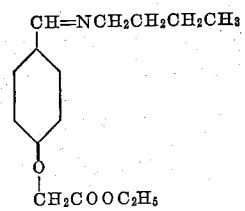

23.9 grams (0.115 mole) of ethyl 4-formylphenoxy-acetate and 8.4 grams (0.115 mole) of normal-butylamine were dissolved in 100 milliliters of benzene and the mixture heated to the boiling point whereupon a reaction occurred with the formation of N-(4-carbethoxymethoxybenzylidene)-normal-butylamine and water of reaction. The latter was distilled from the reaction zone as formed as a benzene-water azeotrope. After about 1 hours, no more water was formed. The pressure on the reaction mixture was then reduced and the mixture fractionally distilled to obtain an N-(4-carbethoxymethoxybenzylidene)-normal-butylamine product boiling at 160°–180° C. at 0.2 millimeter pressure.

*Example 2.—N-(2,4-dichlorobenzylidene)-normal-butylamine*

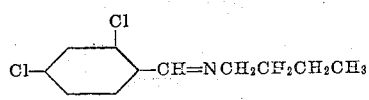

61.3 grams (0.35 mole) of 2,4-dichlorobenzaldehyde and 28.2 grams (0.396 mole) of normal-butylamine were mixed together in 125 milliliters of benzene. The reaction mixture was heated to distill off the water of reaction as a benzene-water azeotrope. The heating was continued until no more water distilled. The remaining solvent and excess amine were then removed by distillation and an N-(2,4-dichlorobenzylidene)-normal-butylamine product recovered as residue. The product was a liquid having a molecular weight of 230.1. The yield of the product was 75.7 grams or 94.1 percent of theoretical.

*Example 3*

In a similar manner the following N-arylidene-normal-butylamines are prepared:

N - (2 - chloro - 6 - nitrobenzylidene) - normal - butylamine having a molecular weight of 240.7 by the reaction of 2-chloro-6-nitrobenzaldehyde and normal-butylamine.

N - (3,4 - dichlorobenzylidene) - normal - butylamine having a molecular weight of 230.1 by the reaction of 3,4-dichlorobenzaldehyde and normal-butylamine.

N - (4 -bromo - 2 - nitrobenzylidene) - normal - butylamine having a molecular weight of 285.1 by the reaction of 4-bromo-2-nitrobenzaldehyde and normal-butylamine.

N - (2 - fluoro - 6 - chlorobenzylidene) - normal-butylamine having a molecular weight of 213.7 by the reaction of 2-fluoro-6-chlorobenzaldehyde and normal-butylamine.

N - (2,6 - dichlorobenzylidene) - normal - butylamine having a molecular weight of 230.12 by the reaction of 2,6-dichlorobenzaldehyde and normal-butylamine.

N - (2 - carbethoxymethoxybenzylidene) - normal - butylamine having a molecular weight of 263.4 by the reaction of 2 - carbethoxymethoxybenzaldehyde and normal-butylamine.

*Example 4.—N-(2,4-dichlorobenzylidene)-normal-propylamine*

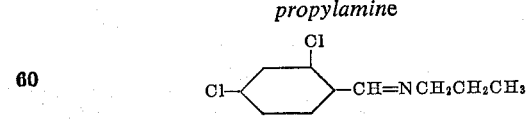

61.3 grams (0.35 mole) of 2,4-dichlorobenzaldehyde and 23.6 grams (0.4 mole) of normal-propylamine are mixed together in 125 milliliters of benzene. The reaction mixture is heated to distill off the water of reaction as a benzene-water azeotrope. The heating is continued until no more water distills. The remaining solvent and excess amine are then removed by distillation and an N-(2,4-dichlorobenzylidene)-normal-propylamine product recovered as residue. The product is a liquid having a molecular weight of 216.1.

Example 5

In a similar manner the following N-arylidene-normal-propylamines are prepared:

N - (4 - bromobenzylidene) - normal - propylamine having a molecular weight of 226.1 by the reaction of 4-bromobenzaldehyde and normal-propylamine.

N - (2,4 - dibromobenzylidene) - normal - propylamine having a molecular weight of 305.1 by the reaction of 2,4-dibromobenzaldehyde and normal-propylamine.

N - (4 - iodobenzylidene) - normal - propylamine having a molecular weight of 273.1 by the reaction of 4-iodobenzaldehyde and normal-propylamine.

N - (4 - phenylbenzylidene) - normal - propylamine having a molecular weight of 223.3 by the reaction of 4-phenylbenzaldehyde and normal-propylamine.

N - (4 - carbethoxymethoxybenzylidene) - normal-propylamine having a molecular weight of 249.4 by the reaction of 4-carbethoxymethoxybenzaldehyde and normal-propylamine.

*Example 6.—N-(2,4-dinitro-1-naphthylidene)-normal-propylamine*

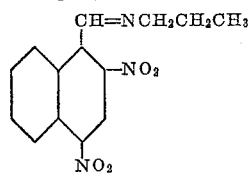

24.6 grams (0.1 mole) of 2,4-dinitro-1-naphthaldehyde, 8.3 milliliters (0.1 mole) of normal-propylamine and 50 milliliters of benzene are mixed together and the resulting mixture heated to distill off the water of reaction as a benzene-water azeotrope. The remaining benzene is distilled out under reduced pressure to obtain an N-(2,4-dinitro-1-naphthylidene)-normal-propylamine product as residue.

Example 7

In a similar manner the following N-naphthylidene-normal-alkylamines are prepared:

N-(5-bromo-2-naphthylidene)-normal-butylamine having a molecular weight of 290.2 by the reaction of 5-bromo-2-naphthaldehyde and normal-butylamine.

N-(4-phenyl - 2 - naphthylidene)-normal-propylamine having a molecular weight of 273.4 by the reaction of 4-phenyl-2-naphthaldehyde and normal-propylamine.

N-(5-bromo - 8 - nitro-1-naphthylidene)-normal-butylamine having a molecular weight of 335.2 by the reaction of 5-bromo-8-nitro-1-naphthaldehyde and normal-butylamine.

The products of this invention are useful as parasiticides adapted to be employed for the control of bacterial and fungal organisms. They are particularly useful as toxicants in germicidal preparations. In a representative operation, N - (2,4 - dichlorobenzylidene)-normal-butylamine was added to bacteriological media to give a concentration of 0.05 percent and the media inoculated with *Staphylococcus aureus* and *Aspergillus terreus* and incubated at 30° C. for 4 days. At the end of this period, complete inhibition of growth of the organisms was observed.

The products are also useful as intermediates for the preparation of a variety of chemical compounds such as aralkylamines and compounds useful as stimulants, medicinals and emulsifying agents. Certain of these compounds have been employed in the preparation of nitroethylene compounds disclosed and claimed in copending applications by Dale N. Robertson, Serial Nos. 616,651 and 616,653, now U.S. Patent Nos. 2,855,443 and 2,855,442, respectively. Certain others of these compounds have been employed in the preparation of phenoxy compounds disclosed and claimed in a copending application of Dale N. Robertson, Serial No. 616,645, filed concurrently herewith, now U.S. Patent No. 2,855,429.

I claim:

1. N-(2-fluoro - 6 - chlorobenzylidene)-normal-butylamine.
2. N-(2,4-dichlorobenzylidene)-normal-butylamine.
3. N - (4 - carbethoxymethoxybenzylidene)-normal-butylamine.
4. N-(2-chloro - 6 - nitrobenzylidene)-normal-butylamine.
5. N-(3,4-dichlorobenzylidene)-normal-butylamine.
6. N-(4-bromo - 2 - nitrobenzylidene)-normal-butylamine.
7. N-(2,6-dichlorobenzylidene)-normal-butylamine.
8. N - (2 - carbethoxymethoxybenzylidene)-normal-butylamine.

References Cited in the file of this patent

UNITED STATES PATENTS

| 2,513,996 | Haury | July 4, 1950 |
| 2,568,579 | Coleman | Sept. 18, 1951 |

FOREIGN PATENTS

| 681,993 | Great Britain | Nov. 5, 1952 |

OTHER REFERENCES

Gnehm et al.: Deutsche Chemische Gesellschaft (Berichte), vol. 29, pp. 875–878 (1896).

Beilstein: vol. 7, pp. 213, 237; (1925); pp. 163–4 (1948).

Beilstein: vol. 6, p. 278 (1931).